(12) United States Patent
Dabbagh et al.

(10) Patent No.: US 8,811,451 B2
(45) Date of Patent: Aug. 19, 2014

(54) APPARATUS AND METHOD FOR SELECTION OF A SET OF CELLS FOR INTERFERENCE CANCELLATION IN A WIRELESS COMMUNICATION SYSTEM

(71) Applicant: Qualcomm Incorporated, San Diego, CA (US)

(72) Inventors: Ameer Dabbagh, San Diego, CA (US); Peter P. Ang, San Diego, CA (US); Rashid Ahmed Akbar Attar, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 13/573,771

(22) Filed: Oct. 3, 2012

(65) Prior Publication Data
US 2013/0083827 A1 Apr. 4, 2013

Related U.S. Application Data

(60) Provisional application No. 61/543,293, filed on Oct. 4, 2011.

(51) Int. Cl.
*H04B 1/00* (2006.01)
*H04B 1/7107* (2011.01)
*H04B 1/707* (2011.01)

(52) U.S. Cl.
CPC .................... *H04B 1/7107* (2013.01); *H04B 2001/70724* (2013.01)
USPC .. 375/144; 375/148; 375/E1.209; 375/E1.03; 375/E1.031

(58) Field of Classification Search
None
See application file for complete search history.

(56) References Cited

U.S. PATENT DOCUMENTS

| 6,967,990 B1 | 11/2005 | Suzuki et al. | |
| 2007/0127558 A1* | 6/2007 | Banister | 375/148 |

OTHER PUBLICATIONS

"3rd Generation Partnership Project; Technical Specification Group Radio Access Network; Feasibility study on the mitigation of the effect of the Common Pilot Channel (CPICH) interference at the User Equipment (Release 5 )", 3GPP Standard; 3GPP TR 25.991, 3rd Generation Partnership Project (3GPP), Mobile Competence Centre ; 650, Route des Lucioles ; F-06921 Sophia-Antipolis Cedex ; France, No. V5.1.0, Dec. 1, 2002, pp. 1-28, XP050369586, Sections 4, 5.1.1, 5.1.2, 5.1.3, and 5.2.1.4.
International Search Report and Written Opinion—PCT/US2012/058737—ISA/EPO—Jul. 12, 2012.

* cited by examiner

*Primary Examiner* — Adolf Dsouza
(74) *Attorney, Agent, or Firm* — QUALCOMM IP Department; James Hunt Yancey, Jr.

(57) ABSTRACT

Apparatus and methods, in several embodiments, are disclosed for generating and managing a set of sectors, the signals received from which are utilized to generate an interference estimate for use by an interference cancellation circuit. The set of sectors generally includes a subset of the combined set of sectors in the Active Set and the Candidate Set for an access terminal. A finger of a receiver at an access terminal can be assigned to each sector in the set of sectors for interference cancellation to improve receiver operations.

36 Claims, 8 Drawing Sheets

APPARATUS AND METHOD FOR SELECTION OF A SET OF CELLS FOR INTERFERENCE CANCELLATION IN A WIRELESS COMMUNICATION SYSTEM

CROSS-REFERENCE TO RELATED APPLICATIONS

This application claims priority to and the benefit of U.S. Provisional Patent Application No. 61/543,293, filed in the United States Patent and Trademark Office on Oct. 4, 2011, the entire content of which is incorporated herein by reference as if fully set forth below and for all applicable purposes.

TECHNICAL FIELD

Embodiments of the present invention relate generally to wireless communication, and more specifically, to receivers for use in a wireless communication system.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power).

To enable sharing of the wireless channel by large numbers of transmitting devices, many systems utilize code division multiple access (CDMA), where transmitted data is spread utilizing a suitable pseudo-random number (PN) spreading code, different PN codes being used by each transmitter. To retrieve the data, a receiver despreads the received signal using a correlation receiver. This way, undesired interfering signals, spread with different (ideally, orthogonal) PN spreading codes, have a low correlation and can be discarded by the correlation receiver.

Because conventional matched filter CDMA receivers are inherently interference-limited, various multiuser detection techniques, such as interference cancellation (IC) receivers, have been developed for CDMA receivers to combat such multiple access interference. IC receivers generally create an estimate of the multiple access interference and subtract that estimate from the received signal.

As the demand for mobile broadband access continues to increase, research and development continue to advance the technology not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One or more aspects of the disclosure provide for generating and managing a set of sectors, the signals received from which are utilized to generate an interference estimate for use by an interference cancellation circuit. The set of sectors generally includes a subset of the combined set of sectors in the Active Set and the Candidate Set for an access terminal, such that a finger of a receiver at the access terminal is assigned to each sector in the set of sectors used for interference cancellation.

For example, one aspect of the disclosure provides a method of cancelling interference at an access terminal, including generating a set of sectors, the set of sectors comprising at least one sector not included in an active set for the access terminal, assigning at least one finger of a receiver at the access terminal to each sector in the set of sectors, generating an interference estimate corresponding to the set of sectors, and cancelling interference from the set of sectors in accordance with the generated interference estimate.

Another aspect of the disclosure provides an access terminal configured for wireless communication, including means for generating a set of sectors, the set of sectors including at least one sector not included in an active set for the access terminal; means for assigning at least one finger of a receiver at the access terminal to each sector in the set of sectors; means for generating an interference estimate corresponding to the set of sectors; and means for cancelling interference from the set of sectors in accordance with the generated interference estimate.

Another aspect of the disclosure provides an access terminal configured for wireless communication, including a processing circuit, a memory coupled to the processing circuit, and a communications interface coupled to the processing circuit, the communications interface including an interference cancellation engine. Here, the processing circuit is configured to generate a set of sectors, the set of sectors comprising at least one sector not included in an active set for the access terminal, to assign at least one finger of a receiver of the communications interface to each sector in the set of sectors, to generate an interference estimate corresponding to the set of sectors, and to cancel interference from the set of sectors in accordance with the generated interference estimate.

Another aspect of the disclosure provides a computer program product, including a computer-readable storage medium operative at an access terminal configured for wireless communication, having instructions for causing a computer to generate a set of sectors, the set of sectors comprising at least one sector not included in an active set for the access terminal, to assign at least one finger of a receiver of the communications interface to each sector in the set of sectors, to generate an interference estimate corresponding to the set of sectors, and to cancel interference from the set of sectors in accordance with the generated interference estimate.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of wireless communication systems, network architectures, and communication standards. Certain aspects of the discussions are described below for CDMA and 3rd Generation Partnership Project 2 (3GPP2) 1× protocols and systems, and related terminology may be found in much of the following description. However, those of ordinary skill in the art will recognize that one or more aspects of the present disclosure may be employed and included in one or more other wireless communication protocols and systems.

Figure 1:
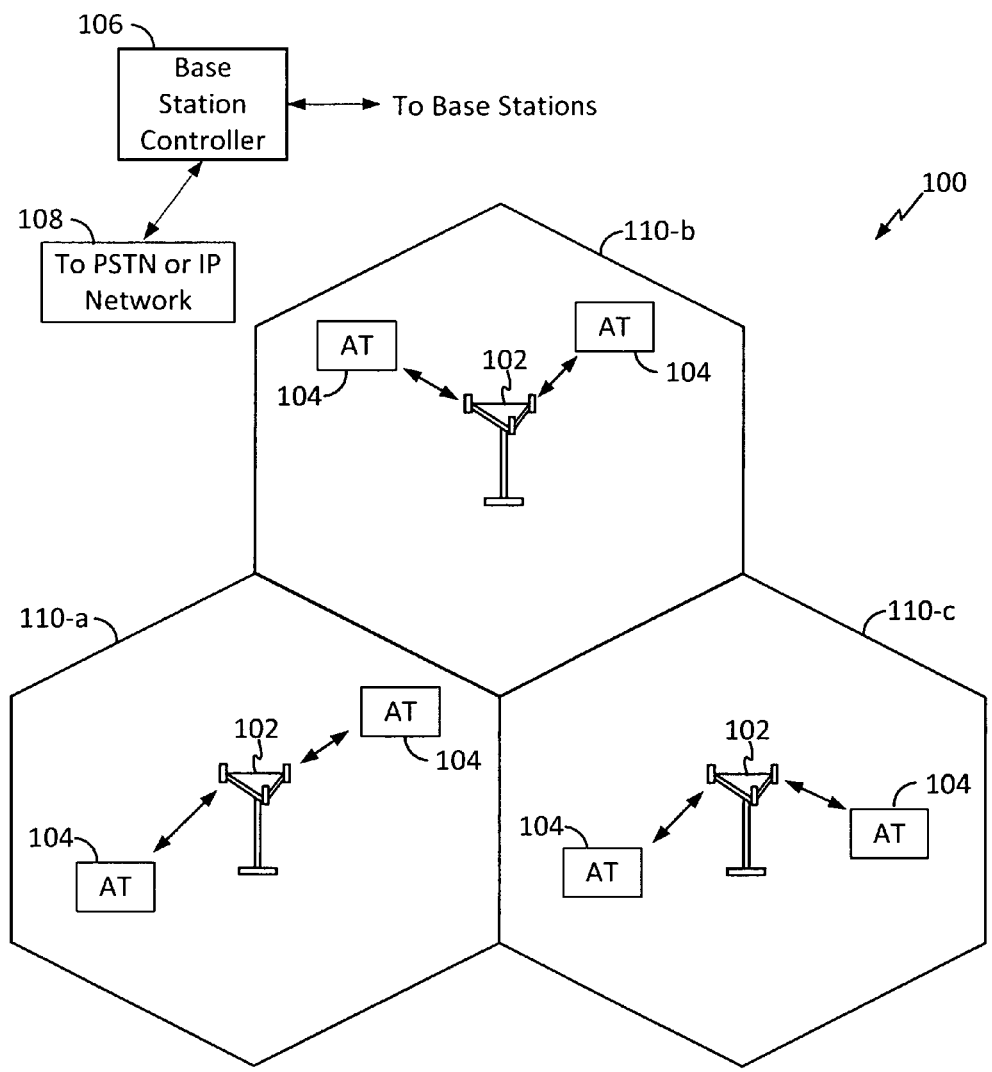
FIG. 1 is a block diagram illustrating an example of a network environment in which one or more aspects of the present disclosure may find application.

FIG. 1 is a block diagram illustrating an example of a network environment in which one or more aspects of the present disclosure may find application. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106 via multiple carriers. Each of the base stations 102 can provide communication coverage for a respective geographic area. The coverage area 110 for each base station 102 here is identified as cells 110-a, 110-b, or 110-c. The coverage area 110 for a base station 102 may be divided into sectors (not shown, but making up only a portion of the coverage area). In a coverage area 110 that is divided into sectors, the multiple sectors within a coverage area 110 can be formed by groups of antennas with each antenna responsible for communication with one or more access terminals 104 in a portion of the cell.

One or more access terminals 104 may be dispersed throughout the coverage areas 110, and may wirelessly communicate with one or more sectors associated with each respective base station 102. An access terminal 104 may generally include one or more devices that communicate with one or more other devices through wireless signals. Such access terminals 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. The access terminals 104 may include mobile terminals and/or at least substantially fixed terminals. Examples of access terminals 104 include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, and/or other communication/computing devices which communicate, at least partially, through a wireless or cellular network.

Figure 2:
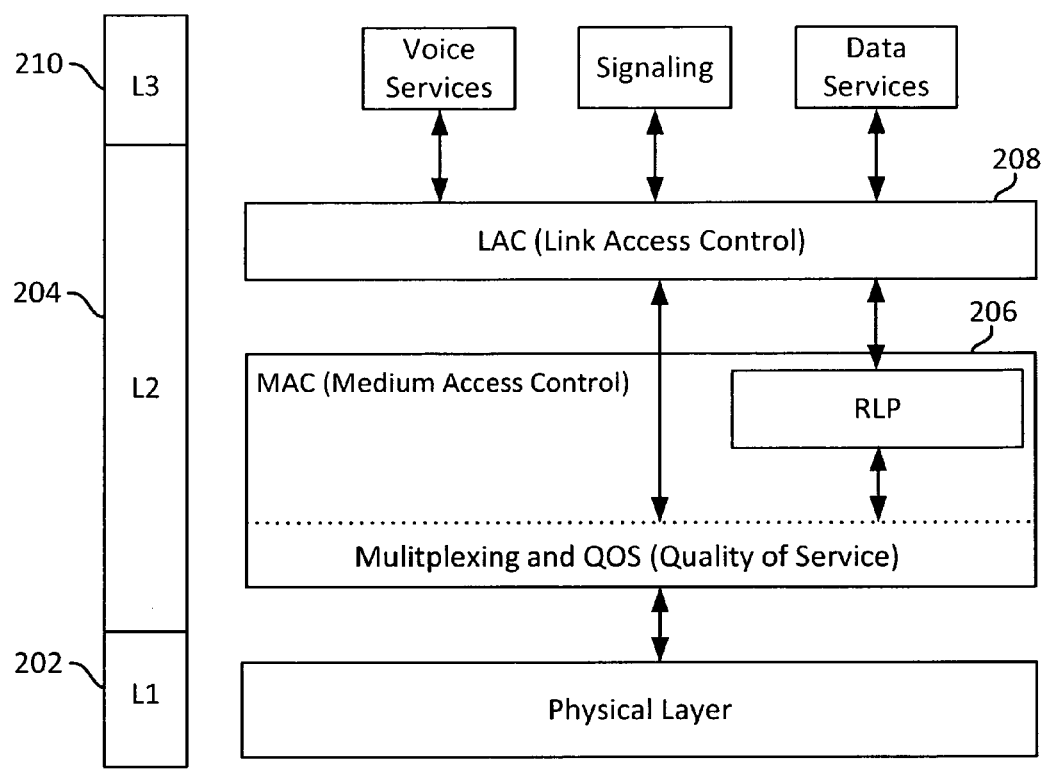
FIG. 2 is a block diagram illustrating an example of a protocol stack architecture which may be implemented by an access terminal.

The access terminal 104 may be adapted to employ a protocol stack architecture for communicating data between the access terminal 104 and one or more network nodes of the wireless communication system 100 (e.g., the base station 102). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 2 is a block diagram illustrating an example of a protocol stack architecture which may be implemented by an access terminal 104. Referring to FIGS. 1 and 2, the protocol stack architecture for the access terminal 104 is shown to generally include three layers: Layer 1 (L1), Layer 2 (L2), and Layer 3 (L3).

Layer 1 202 is the lowest layer and implements various physical layer signal processing functions. Layer 1 202 is also referred to herein as the physical layer 202. This physical layer 202 provides for the transmission and reception of radio signals between the access terminal 104 and a base station 102.

The data link layer, called layer 2 (or "the L2 layer") 204 is above the physical layer 202 and is responsible for delivery of signaling messages generated by Layer 3. The L2 layer 204 makes use of the services provided by the physical layer 202. The L2 layer 204 may include two sublayers: the Medium Access Control (MAC) sublayer 206, and the Link Access Control (LAC) sublayer 208.

The MAC sublayer 206 is the lower sublayer of the L2 layer 204. The MAC sublayer 206 implements the medium access protocol and is responsible for transport of higher layers' protocol data units using the services provided by the physical layer 202. The MAC sublayer 206 may manage the access of data from the higher layers to the shared air interface.

The LAC sublayer 208 is the upper sublayer of the L2 layer 204. The LAC sublayer 208 implements a data link protocol that provides for the correct transport and delivery of signaling messages generated at the layer 3. The LAC sublayer makes use of the services provided by the lower layers (e.g., layer 1 and the MAC sublayer).

Layer 3 210, which may also be referred to as the upper layer or the L3 layer, originates and terminates signaling messages according to the semantics and timing of the communication protocol between a base station 102 and the access terminal 104. The L3 layer 210 makes use of the services provided by the L2 layer. Information (both data and voice) message are also passed through the L3 layer 210.

Figure 3:
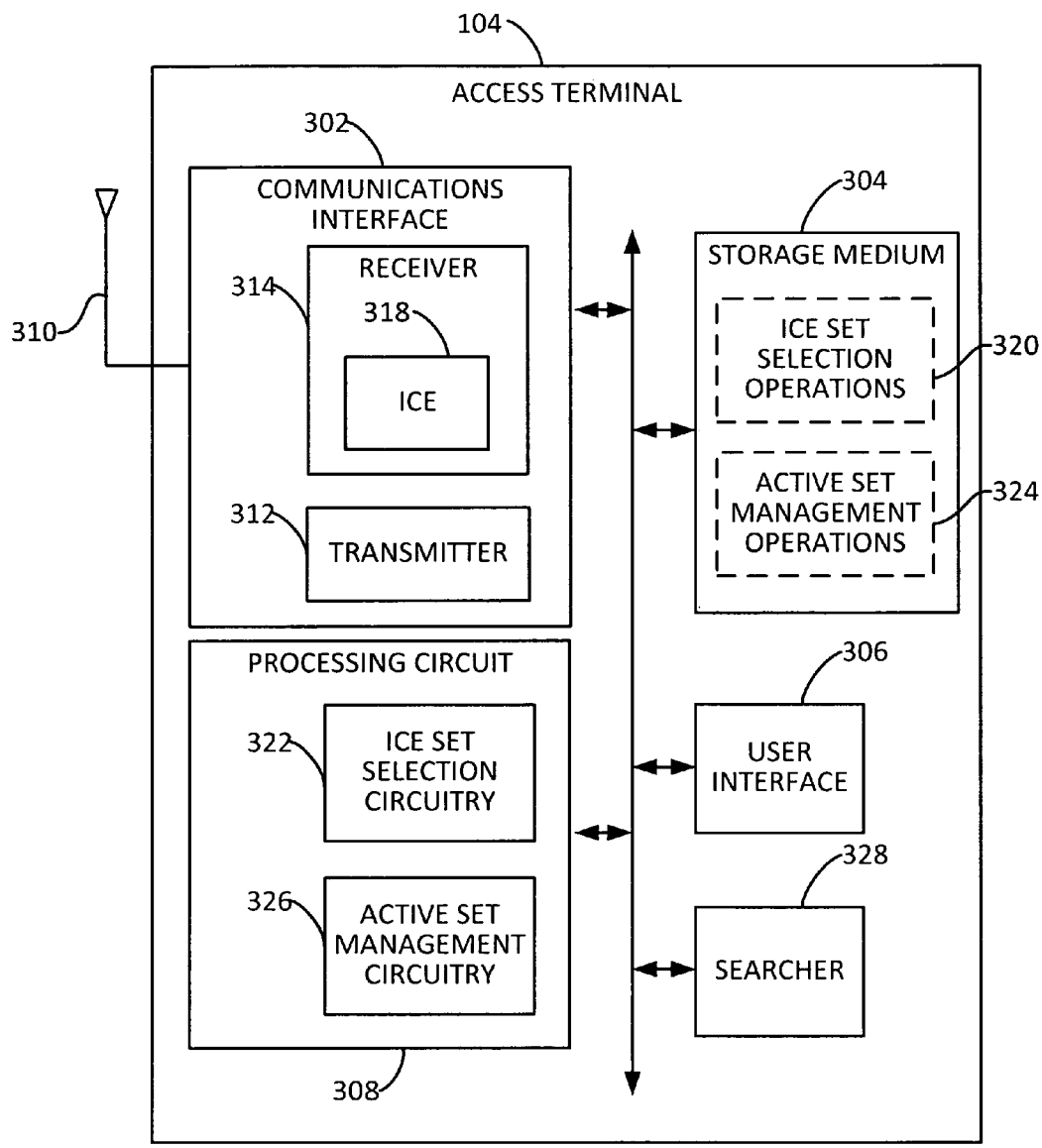
FIG. 3 is a block diagram illustrating select components of an access terminal according to at least one example.

FIG. 3 shows a block diagram illustrating select components of an access terminal 104 according to at least one example of the present disclosure. The access terminal 104 includes a communications interface 302, a storage medium 304, a user interface 306, and a searcher circuit 328. These components can be coupled to and/or placed in electrical communications with a processing circuit 308.

The communications interface 302 may be adapted to facilitate wireless communications of the access terminal 104. For example, the communications interface 302 may include circuitry and/or programming adapted to facilitate the communication of information bi-directionally with respect to one or more communications devices in a network. The communications interface 302 may be coupled to one or more antennas 310 for wireless communications within a wireless communications system.

The communications interface 302 can be configured with one or more standalone receivers and/or transmitters, as well as one or more transceivers. In the illustrated example, the communications interface 302 includes a transmitter 312 and a receiver 314. As one nonlimiting example, the receiver 314 includes an interference cancellation engine (ICE) 318. As a further example, the receiver 314 may include a Rake receiver having a plurality of correlation receivers, or fingers.

That is, in any CDMA system, to enable multiple access, transmitted data is spread utilizing a suitable PN spreading code. To retrieve the data, a receiver is accordingly required to despread the received signal. To this end, CDMA receivers utilize a correlation receiver. That is, a desired signal is detected according to its correlation with an internally generated PN spreading code, which is known to be the same spreading code used at the transmitter. This way, undesired interfering signals, spread with different (ideally, orthogonal) PN spreading codes, have a low correlation and can be discarded by the correlation receiver.

However, conventional matched filter CDMA receivers are inherently interference-limited, such that there is a limited number of interfering signals for which the receiver can accommodate. To improve the situation, various multiuser detection techniques have been developed for CDMA receivers to combat such multiple access interference. For example, various linear equalizers and subtractive interference cancellation (IC) receivers have been designed for multiuser detection. Some examples of linear equalizers include the zero-forcing (ZF) or decorrelating detector, and the minimum mean square (MMSE) detector. On the other hand, IC receivers generally create an estimate of the multiple access interference and subtract that estimate from the received signal. In an aspect of the disclosure, the interference cancellation engine (ICE) 318 may function as such an IC receiver.

The storage medium 304 may represent one or more computer-readable, machine-readable, and/or processor-readable devices for storing programming, such as processor executable code or instructions (e.g., software, firmware), electronic data, databases, or other digital information. The storage medium 304 may also be used for storing data that is manipulated by the processing circuit 308 when executing programming. The storage medium 304 may be any available media that can be accessed by a general purpose or special purpose processor, including portable or fixed storage devices, optical storage devices, and various other mediums capable of storing, containing or carrying programming. By way of example and not limitation, the storage medium 304 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 304 may be coupled to the processing circuit 306 such that the processing circuit 306 can read information from, and write information to, the storage medium 304. That is, the storage medium 304 can be coupled to the processing circuit 306 so that the storage medium 304 is at least accessible by the processing circuit 306, including examples where at least one storage medium is integral to the processing circuit 306 and/or examples where at least one storage medium is separate from the processing circuit 306 (e.g., resident in the access terminal 104, external to the access terminal 104, distributed across multiple entities).

Programming stored by the storage medium 304, when executed by the processing circuit 306, causes the processing circuit 306 to perform one or more of the various functions and/or process steps described herein. For example, the storage medium 304 may include ICE Set selection operations 320 adapted for regulating operations at one or more hardware blocks of the processing circuit 306, and/or regulating a sequence of operations when utilizing the receiver 314, as described in further detail below. The ICE Set selection operations 320 may include programming implemented at layer 1 or layer 2 of the protocol stack architecture depicted in FIG. 2, adapted for selecting a set of cells on which an interference cancellation signal utilized by the ICE circuit 318 may be based, as described in further detail below, particularly in relation to FIGS. 7-8.

In a further aspect of the disclosure, the storage medium 304 may include Active Set management operations 324, including programming adapted for managing an Active Set, as described in further detail below, particularly in relation to FIG. 6.

The processing circuit 308 is generally adapted for processing, including the execution of such programming stored on the storage medium 304. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 308 is arranged to obtain, process and/or send data, control data access and storage, issue commands, and control other desired operations. The processing circuit 308 may include circuitry configured to implement desired programming provided by appropriate media in at least one example. For example, the processing circuit 308 may be implemented as one or more processors, one or more controllers, and/or other structure configured to execute executable programming. Examples of the processing circuit 308 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 308 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 306 are for illustration and other suitable configurations within the scope of the present disclosure are also contemplated.

According to one or more aspects of the present disclosure, the processing circuit 306 may be adapted to perform any or all of the features, processes, functions, steps and/or routines for any or all of the access terminals 104 described herein. As used herein, the term "adapted" in relation to the processing circuit 306 may refer to the processing circuit 306 being one or more of configured, employed, implemented, and/or programmed to perform a particular process, function, step and/or routine according to various features described herein.

According to at least one example of the access terminal 104, the processing circuit 306 may include ICE Set selection circuitry 322 adapted for selecting a set of sectors on which an interference cancellation signal utilized by the ICE 318 may be based, as described in further detail below, particularly in relation to FIGS. 7-8. The ICE Set selection circuitry 322 may operate independently of, or may utilize programming stored on, one or more components of the storage medium 304. In a further aspect of the disclosure, the processing circuit 306 may include Active Set management circuitry 326 adapted for managing an Active Set, as described in further detail below, particularly in relation to FIG. 6.

Figure 4:
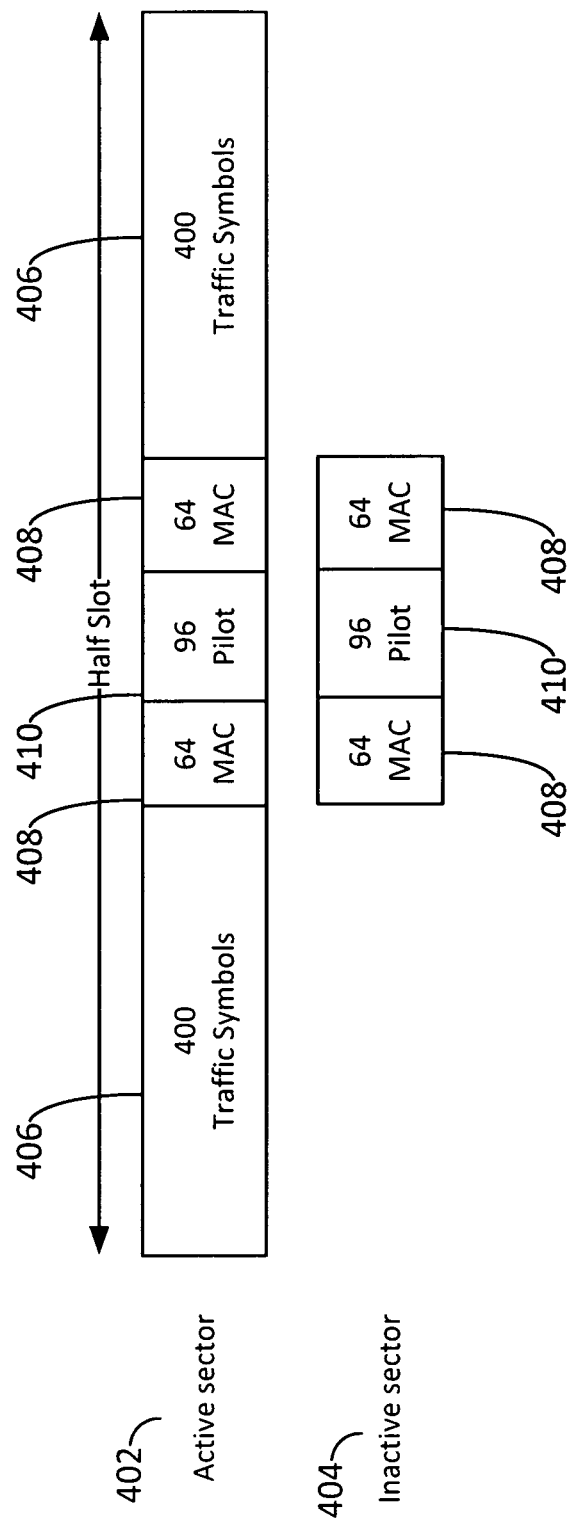
FIG. 4 is a timing diagram schematically illustrating a forward link channel structure in a EV-DO network according to one example.

Referring now to FIG. 4, a timing diagram is illustrated to show a forward link channel structure in an EV-DO network. In the illustration, an active sector 402 is illustrated transmitting traffic symbols 406, MAC packets 408, and a pilot 410. Further, an inactive sector 404 is illustrated transmitting MAC packets 408 and a pilot 410. That is, in the illustrated example, the inactive sector is shown during a half slot in which it does not transmit traffic symbols.

Figure 5:
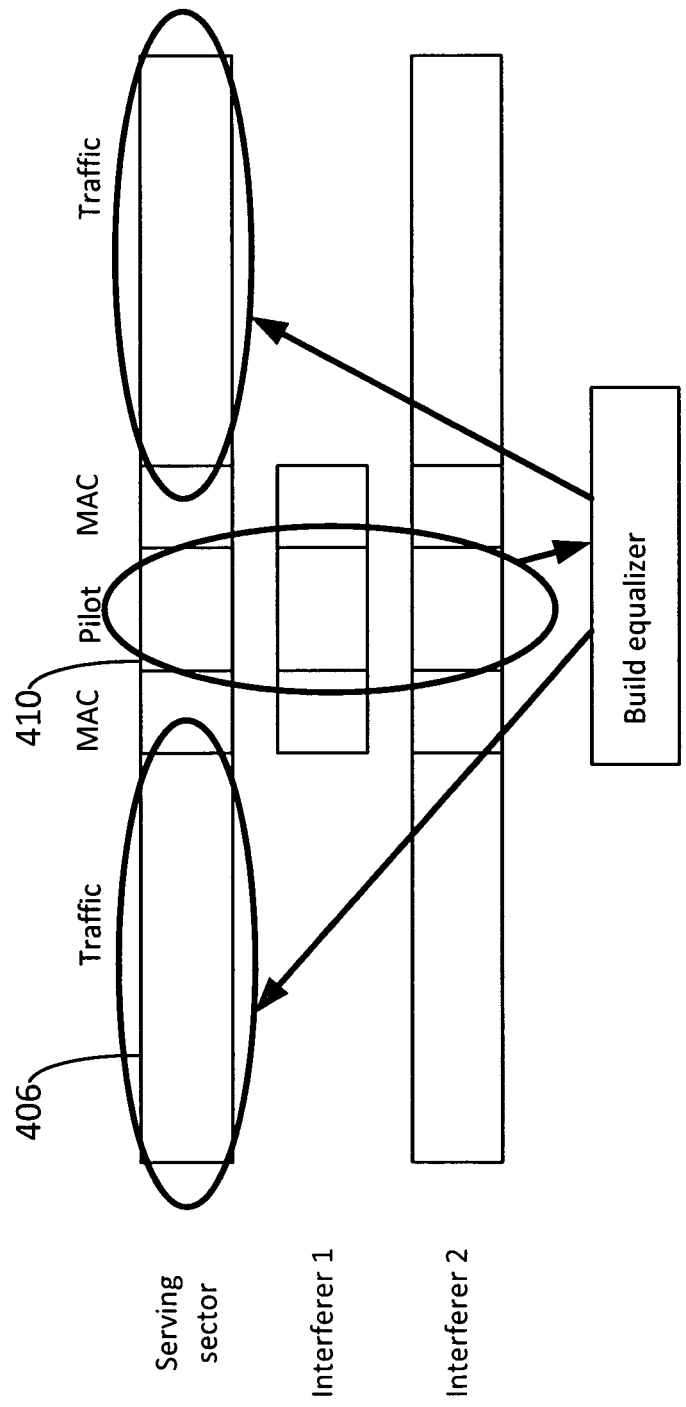
FIG. 5 is a diagram illustrating that an equalizer can generate interference statistics during traffic segments, in addition to or in the alternative to, interference statistics generated only during the pilot in accordance with some embodiments of the present invention.

Some interference cancellation engines are known only to generate a channel and interference estimate of interfering sectors based on received signals during the pilot burst 410 only, essentially assuming the same interference levels caused by those sectors during the pilot burst 410 and the traffic segment 406. However, during a so-called partial neighbor loading scenario, wherein the interfering sectors are relatively lightly loaded, there can be a substantial mismatch between SINR during pilot bursts and SINR during traffic segments. Thus, as illustrated in FIG. 5, more advanced interference cancellation engines have been created. Such engines are enabled to generate interference statistics during the traffic segment 406, in addition to or in the alternative to, those generated only during the pilot 410.

In any interference cancellation engine, an important consideration is the set of sectors upon which the interference estimate is based. Of course, the effectiveness of the interference cancellation is highly dependent on the cancellation of the strongest interferers, but the performance can severely degrade if one or more relatively strong interferers exist in the background without otherwise being accounted for.

Thus, various aspects of the present disclosure provide for management of the set of sectors upon which the interference estimate is based, for use by an interference cancellation engine.

In one aspect of the disclosure, discussed in further detail below, the set of sectors upon which the interference estimate is based may be determined in part by utilizing legacy Active Set management procedures as a baseline.

Figure 6:
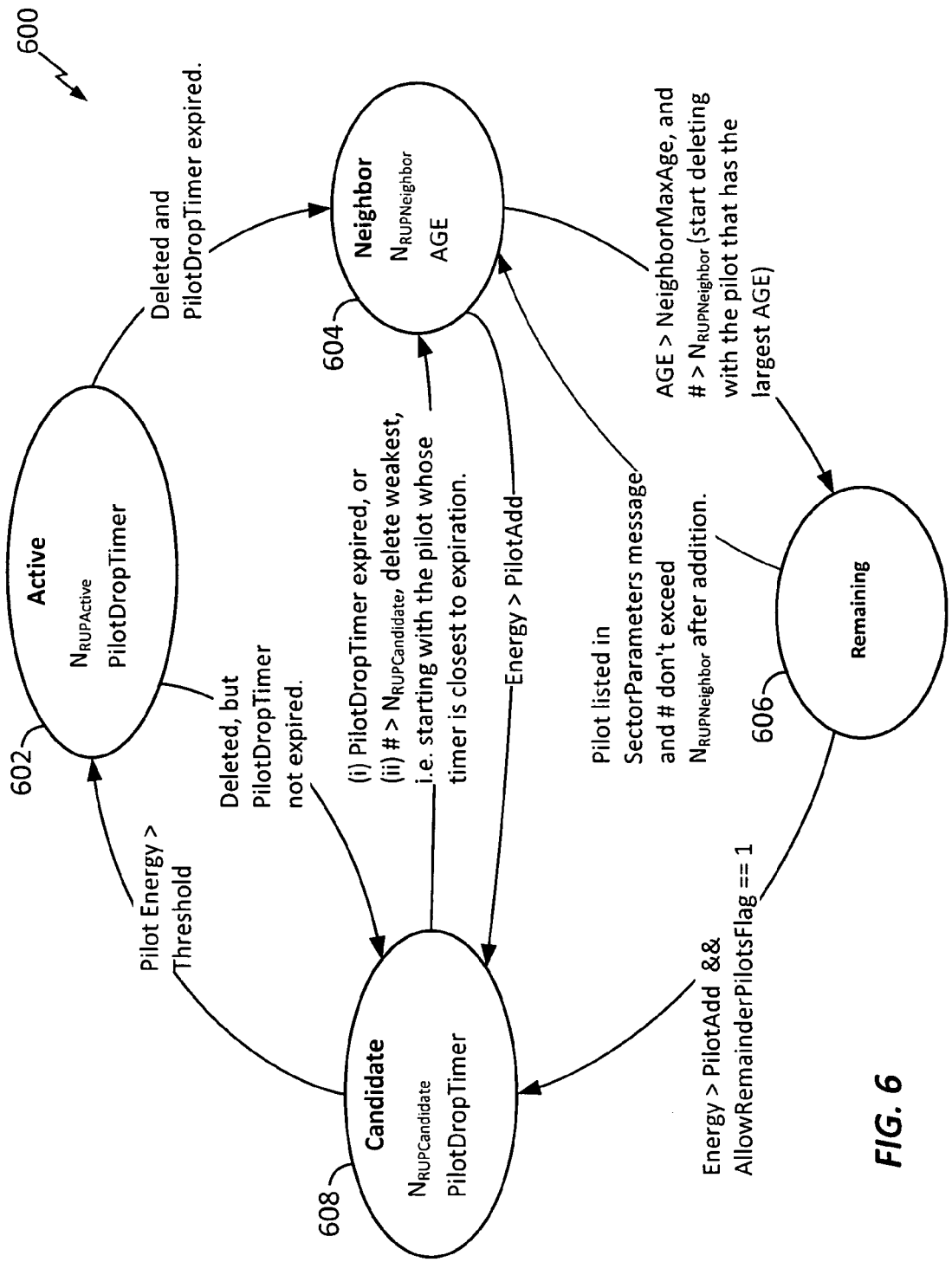
FIG. 6 is a state diagram schematically illustrating one example of an Active Set management algorithm according to some embodiments of the present invention.

FIG. 6 is a state diagram illustrating a legacy Active Set management algorithm utilized in some conventional EVDO access terminals. In the illustration, each detected sector is assigned to one of the sets, illustrated as a state. That is, a detected sector may be within one of four sets: an Active Set 602, a Neighbor Set 604, a Remaining Set 606, and a Candidate Set 608. Those skilled in the art will recognize this set management algorithm, which appears in published specifications for IS-856 technology, also referred to as cdma2000.

The Active Set 602 may include a set of sectors to which the access terminal 104 is simultaneously connected (e.g., when the access terminal is in soft handover, or has communication links with multiple cells). In general, there is a maximum size of the Active Set 602, referred to as $N_{RUPActive}$. In a conventional algorithm, only sectors in the Active Set state 602 are assigned fingers at the receiver 314 of the access terminal 104, such that those sectors may then be monitored by the access terminal 104. To combat multipath interference, it is typically the case that one or more of the sectors in the Active Set 602 may have a plurality of fingers assigned to that sector, each of those fingers configured corresponding to an energy peak from that sector.

However, as will be described in further detail below, in an aspect of the present disclosure for interference cancellation purposes, at least one finger at the receiver 314 may be assigned to sectors outside of those in the Active Set 602, such as one or more sectors in the Candidate Set 608.

When an access terminal is in its idle state, a sector may move from the Candidate Set 608 to the Active Set 602 if the Active Set 602 is not already full. If the Active Set 602 is full, the sector can still move to the Active Set 602 if its energy is greater than or equal to some threshold amount above the minimum pilot energy of the sectors in the Active Set 602. When the access terminal is in its connected state, a sector may similarly move from the Candidate Set 608 to the Active Set 602, with the additional requirement that all suggested promotions or demotions to/from the Active Set 602 are reported to the base station, and performed only after commanded by the base station.

The Candidate Set 608 may include a set of sectors that are candidates to be added to the Active Set 602. Generally a sector that is not in the Active Set 602 is added to the Candidate Set 608 when the energy of its pilot exceeds the value specified by the parameter PilotAdd. For sectors that are in the Active Set 602, they may move to the Candidate Set 608 when the sector is deleted from the Active Set 602, but when its pilot drop timer (called PilotDropTimer) has not yet expired. Here, PilotDropTimer is a timer utilized for determining how long it has been since the pilot strength for the sector has dropped below a PilotDrop threshold. That is, the value of PilotDropTimer is started whenever the pilot strength falls below the PilotDrop threshold, and reset when the pilot strength rises above the PilotDrop threshold. In general, there is a maximum size of the Candidate Set 608, referred to as $N_{RUPCandidate}$.

A sector may be deleted from the Candidate Set 608 when the PilotDropTimer for that sector has expired; when that sector is added to the Active Set 602; or when a sector is added to the Candidate Set 608 such that the size of the Candidate Set exceeds $N_{RUPCandidate}$. In this case, the access terminal deletes the sector having the weakest pilot in the Candidate Set 608.

The Neighbor Set 604 may include a set of sectors that neighbor the serving sector. Generally, there is a minimum size of the Neighbor Set 604, referred to as $N_{RUPNeighbor}$. Sectors in the Neighbor Set 604 are characterized by a counter referred to as an Age. The Age of the sector in the neighbor set 604 is initialized to zero at the time when the sector is deleted from the Active Set 602 or the Candidate Set 608, and added to the Neighbor Set 604. The maximum Age of a pilot in the Neighbor Set 604 is a value NeighborMaxAge.

Here, if a sector is added to either the Active Set 602 or the Candidate Set 608, it is deleted from the Neighbor Set 604. Sectors are deleted from the Neighbor Set 604 for various reasons, such as if the pilot energy of that sector is greater than the value of PilotAdd, or if the Age is greater than NeighborMaxAge The Remaining Set 606 includes remaining sectors that are not part of any other set, which may still present interference to the access terminal. In particular, a sector is added to the Remaining Set 606 if it is deleted from the Neighbor Set 604 but not added to any other set.

As described above, for the use of an interference cancellation engine ICE 318 as illustrated in FIG. 3, the generation of the set of sectors upon which the interference estimate is based may depend at least in part upon such an Active Set management algorithm. One straightforward way to generate a set of sectors on which to base an interference estimate would be simply to use those sectors in the Active Set 602. That is, as described above, when the interference cancellation estimate is based on interference statistics generated during the traffic segment, In general, any set management algorithm generating a set of sectors for generating an interference estimate may be adapted to attempt to maximize the number of sectors in the set that are generating strong interference.

Therefore, some aspects of the present disclosure provide for an interference cancellation engine set (ICE Set), including a set of sectors upon which an interference estimate used by the ICE 318 is based. In some aspects, for example, in a single carrier system, a single ICE Set may be generated corresponding to interfering sectors detected in that carrier frequency. In other aspects, for example, in a multi-carrier system, two or more ICE sets may be generated, each one corresponding to interfering sectors detected in their respective carrier frequencies.

Single Carrier ICE Set Management

In an aspect of the disclosure, the access terminal 104 may utilize the Active Set management algorithm described above and illustrated in FIG. 6 as a basis for its determination of the ICE set. For example, FIG. 7 is a flow chart illustrating an exemplary process for determining the ICE Set, which includes a set of sectors upon which an interference estimate is based. In some examples, the process 700 may be implemented by the access terminal 104, e.g., by one or both of the ICE Set selection circuitry 322 and/or the ICE Set selection operations 320 stored in the memory 304.

The process 700 is illustrated assuming the Active Set management algorithm illustrated in FIG. 6 to be operating at the time that the process 700 begins, such that at least the Active Set 602 and the Candidate Set 608 are generated and known.

In various aspects of the disclosure, the ICE Set may be a subset of the sectors in the combination of the Active Set 602 and the Candidate Set 608. For example, the ICE Set may include all the sectors in the Active Set 602 and, zero or more sectors from the Candidate Set 608. In another example, the ICE Set may include any subset of the combination of the Active Set 602 and the Candidate Set 608, which may include less than all sectors in the Active Set 602 and/or the Candidate Set 608. In yet another example, the ICE set can include any suitable set of sectors managed by the Active Set management algorithm illustrated in FIG. 6, as determined to be suitable for the cancellation of interference from those sectors.

Figure 7:
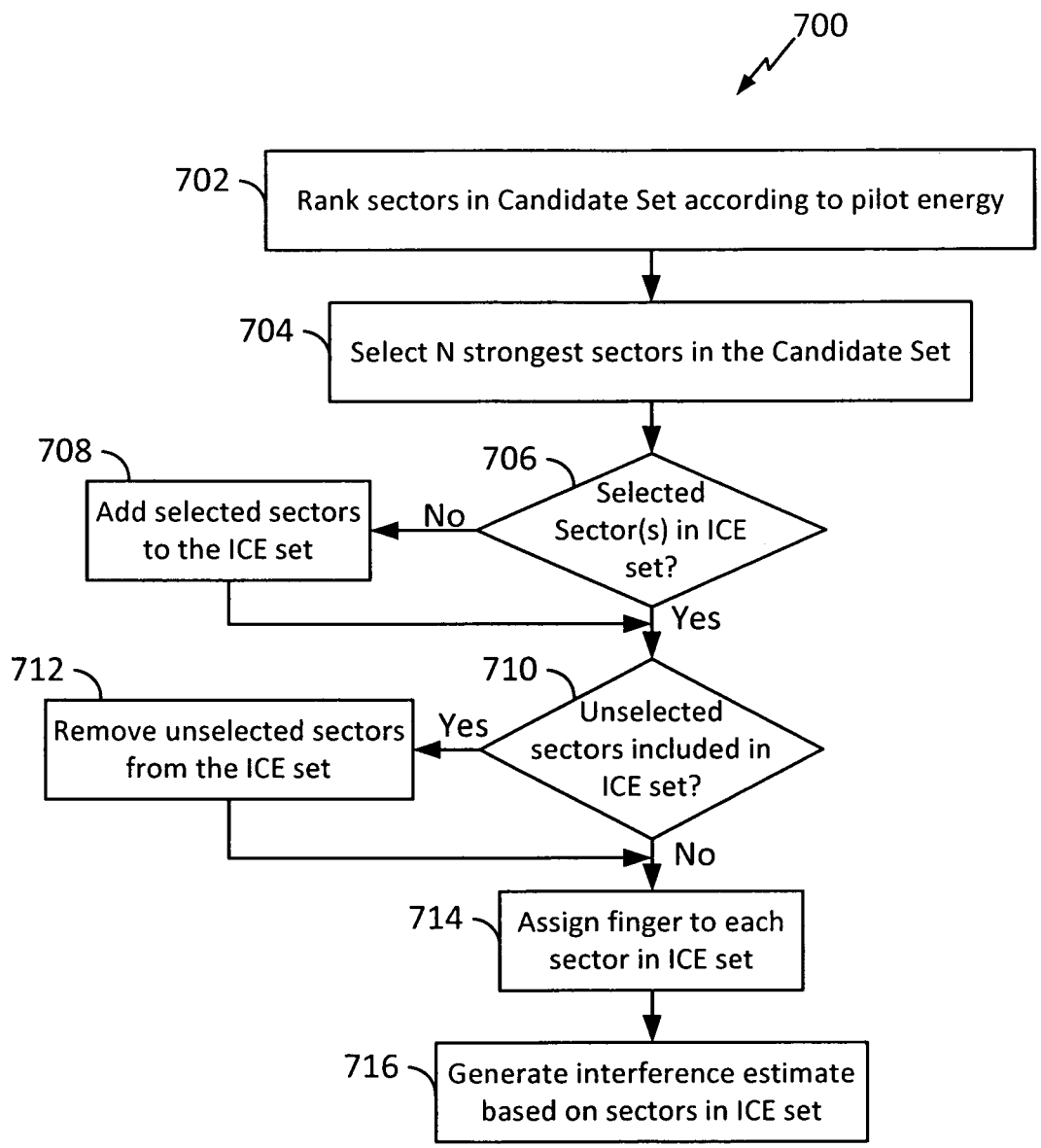
FIG. 7 is a flow chart illustrating a method of generating a set of sectors on which to base an interference cancellation estimate according to some embodiments of the present invention.

As one nonlimiting example described here for the purpose of illustration, referring to FIG. 7, as the process 700 begins all sectors in the Active Set 602 are assumed to be included in the ICE Set. At step 702, the access terminal 104 may rank the sectors in the Candidate Set 608 in accordance with the pilot energy reported for each sector by searcher circuitry 328. Once the sectors in the Candidate Set 608 are ranked, the access terminal 104 may select the N strongest sectors in the Candidate Set 608. In one example, N may be determined according to the following equation:

$$N = \max(\text{ISET}_{max} - \text{ASET}, 0)$$

Here, $\text{ISET}_{max}$ is the maximum theoretical size of the ICE Set 610. In one example, $\text{ISET}_{max}$ may be equal to the total number of fingers at the receiver 314. However, as described above, some of the sectors in the Active Set 602 may have more than one finger assigned to them for multipath reception, in which case $\text{ISET}_{max}$ may be less than the total number of fingers at the receiver 314. Further, ASET is the current size of the Active Set 602. Thus, in accordance with the above equation, N would always take a value greater than or equal to zero.

At step 706, the access terminal 104 may determine whether any of the N sectors selected in step 704 are already included in the ICE Set. If any of the N selected sectors are not already in the ICE set, then the process may proceed to step 708, wherein those selected sectors may be added to the ICE set. Otherwise, the process may proceed to step 710, wherein the access terminal 104 may determine whether any of the sectors in the Candidate Set 608 that were not among the N selected sectors are included in the ICE Set. If any of the unselected sectors are in the ICE set, then the process may proceed to step 712, where those unselected sectors may be removed from the ICE Set.

Thus, a combination of the Active Set 602 and, potentially (i.e., if N>0), one or more selected sectors from the Candidate Set 608, may form the ICE Set.

In a further aspect of the disclosure, the access terminal 104 may promote the selected sectors from the Candidate Set 608, which are not part of the Active Set 602 but are selected for inclusion into the ICE set, such that a finger of the receiver 314 is assigned to each of the promoted sectors. That is, in a conventional access terminal, generally only sectors in the Active Set 602 have a finger of the receiver 314 assigned, for tracking and searcher tasks. However, in order to track the promoted sectors from the Candidate Set 608 and make pilot measurements of those sectors for the generation of the interference estimate, the access terminal 104 configured in accordance with an aspect of the disclosure can, at step 714, autonomously assign a finger of the receiver 314 to track each respective promoted sector, without necessarily receiving authorization to do so from the network. In this way, since a finger is also assigned to each sector in the Active Set 602, pilot measurements may be made of all cells in the ICE Set. Thus, at step 716 the access terminal 104 may generate an interference estimate based on all sectors in the ICE set, including the Active Set 602 and the selected sectors from the Candidate Set 608.

Once the ICE Set is established, e.g., as described above in relation to FIG. 7, as the access terminal 104 moves about the service area, and/or as the channel conditions change over time, maintenance of the ICE Set may be performed to ensure that the interference estimate continues to be based upon the strongest interferers.

Figure 8:
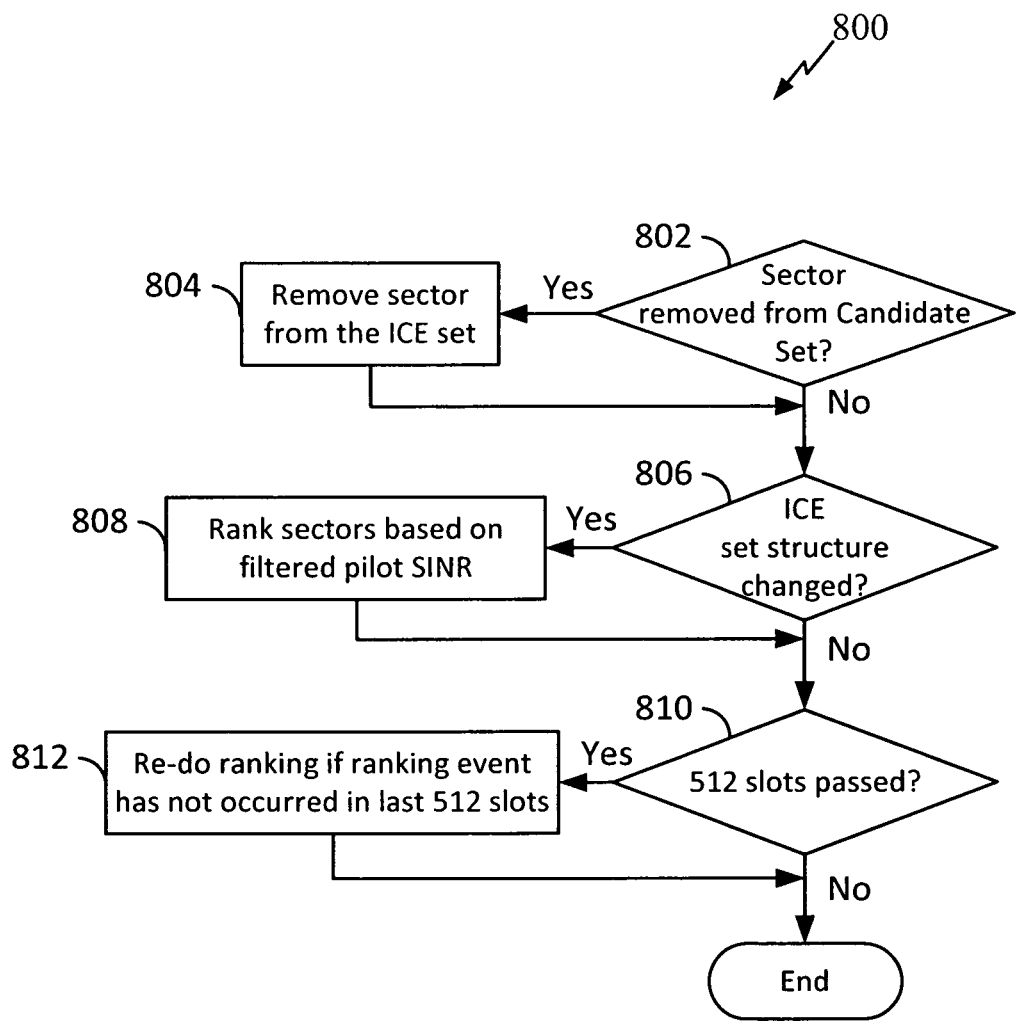
FIG. 8 is a flow chart illustrating a method of maintaining a set of sectors on which an interference cancellation estimate is based according to some embodiments of the present invention.

FIG. 8 is a flow chart illustrating an exemplary process for maintaining the ICE Set in accordance with some aspects of the disclosure. Here, the process 800 may be implemented by the access terminal 104, e.g., by the ICE Set selection circuitry 322 and/or the ICE Set selection operations 320 in the memory 304. The steps illustrated in process 800 are merely exemplary in nature, and additional and/or different steps may be utilized in various examples to maintain the ICE Set.

At step 802, the access terminal 104 may determine whether any promoted sector in the Candidate Set 608 (i.e., a sector in both the Candidate Set 608 and the ICE Set) has been removed from the Candidate Set 608, but not added to the Active Set 602. As described above in relation to FIG. 6, sectors may be removed from the Candidate Set 608 for various reasons, e.g., being moved to the Neighbor Set 604 when the pilot drop timer expires, or when the number of sectors in the Candidate Set exceeds the maximum number of allowed sectors in that set, $N_{RUPCandidate}$. Here, if a promoted sector is removed from the Candidate Set 608 without being added to the Active Set 602, then at step 804 the access terminal may remove that sector from the ICE Set. Otherwise, the process may proceed to step 806, wherein the access terminal 104 may determine if the structure of the ICE Set has changed in any way, e.g., if a sector is promoted from the Candidate Set 608 to the Active Set 602; if a sector is demoted from the Active Set 602 to the Candidate Set 608; or more generally, if a sector is added or removed from either the Active set 602 or the Candidate Set 608. If yes, then the process may proceed to step 808, wherein the access terminal 104 may determine a ranking of the sectors in the ICE Set. For example, the ranking may be based on a filtered SINR of the received pilot transmissions from each sector in the ICE Set as measured by the assigned fingers and reported by firmware at the access terminal 104. In some examples, if a sector is newly added such that the filtered SINR is not yet available, the SINR for that sector's pilot may be assumed to be zero, such that that sector would rank last in the ICE Set. Based on the ranking performed in step 808, the access terminal 104 may re-generate the list of sectors in the ICE Set in accordance with the ranking. Here, it is possible that one or more sectors in the Active Set 602 may be excluded from the ICE Set, and it is possible that one or more sectors in the Candidate Set 608 may be included in the ICE Set.

If a ranking event (e.g., corresponding to the ranking of the sectors in the ICE Set as described above in relation to Step 808) has not occurred in a certain period of time, additional rankings and re-calculations of the sectors to be included in the ICE Set may be performed as needed. For example, at step 810 the access terminal 104 may determine whether a predetermined number of slots (e.g., 512 slots) has passed: if yes, then at step 812 the access terminal 104 may re-rank the sectors if a ranking event has not occurred during that predetermined number of slots.

Multi-Carrier ICE Set Management

In many wireless communication systems, more than one carrier frequency might be available for use by each access terminal. That is, the access terminal 104 may be configured to simultaneously receive forward link transmissions on two or more carrier frequencies. In such a multi-carrier network, each of a plurality of base stations may be transmitting forward link signals on each of the carrier frequencies. Thus, the access terminal 104 may have a different Active Set and Candidate Set for each of the carrier frequencies. That is, the Active Set management algorithm 600 illustrated in FIG. 6 may be performed in parallel for each carrier frequency.

Here, while transmissions on one carrier frequency generally would not present interference issues with transmissions on other carrier frequencies, it is generally the case that each carrier frequency may be subjected to interference from other transmissions in that same carrier frequency.

Thus, in a further aspect of the disclosure, the interference cancellation engine 318 may be configured to generate a different interference estimate for each of the plurality of carrier frequencies. That is, the process described above and illustrated in FIGS. 7 and 8 may be performed in parallel for each of the carrier frequencies, generating an ICE Set corresponding to each carrier.

While the above discussed aspects, arrangements, and embodiments are discussed with specific details and particularity, one or more of the components, steps, features and/or functions illustrated in FIGS. 1, 2, and/or 3 may be rearranged and/or combined into a single component, step, feature or function or embodied in several components, steps, or functions. Additional elements, components, steps, and/or functions may also be added or not utilized without departing from the invention. The apparatus, devices and/or components illustrated in FIGS. 1, 2, and/or 3 may be configured to perform or employ one or more of the methods, features, parameters, or steps described in FIGS. 6, 7, and/or 8. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

We claim:

1. A method of cancelling interference at an access terminal, comprising:
   generating a set of sectors, the set of sectors comprising at least one sector not included in an active set for the access terminal;
   assigning at least one finger of a receiver at the access terminal to each sector in the set of sectors;
   generating an interference estimate corresponding to the set of sectors; and
   cancelling interference from the set of sectors in accordance with the generated interference estimate.

2. The method of claim 1, wherein the at least one sector not included in the active set comprises a sector included in a candidate set, and wherein the candidate set comprises a set of sectors that are candidates to be added to the active set for the access terminal.

3. The method of claim 2, further comprising: selecting the at least one sector to be included in the set of sectors in accordance with a pilot energy of the at least one sector.

4. The method of claim 2, further comprising:
   ranking sectors included in a candidate set for the access terminal in accordance with a pilot energy of each sector included in the candidate set; and
   selecting the at least one sector to be included in the set of sectors in accordance with the ranking.

5. The method of claim 2, wherein the generating of the set of sectors comprises:
   selecting N strongest sectors in the candidate set in accordance with a pilot energy of each of the sectors in the candidate set; and
   adding at least one of the N selected sectors to the set of sectors.

6. The method of claim 2, further comprising: removing a first sector from the set of sectors, responsive to the first sector being removed from the candidate set.

7. The method of claim 2, further comprising:
   ranking a combined set of sectors comprising the sectors in the active set and the candidate set for the access terminal in accordance with a signal-to-interference-and-noise ratio of each of the combined set of sectors; and
   re-generating the set of sectors in accordance with the ranking.

8. The method of claim 1, wherein the set of sectors comprises less than all sectors included in the active set for the access terminal.

9. The method of claim 1, further comprising: autonomously assigning the at least one finger of the receiver to each sector in the set of sectors without receiving authorization from a network.

10. An access terminal configured for wireless communication, comprising:
    means for generating a set of sectors, the set of sectors comprising at least one sector not included in an active set for the access terminal;
    means for assigning at least one finger of a receiver at the access terminal to each sector in the set of sectors;
    means for generating an interference estimate corresponding to the set of sectors; and
    means for cancelling interference from the set of sectors in accordance with the generated interference estimate.

11. The access terminal of claim 10, wherein the at least one sector not included in the active set comprises a sector included in a candidate set, and
    wherein the candidate set comprises a set of sectors that are candidates to be added to the active set for the access terminal.

12. The access terminal of claim 11, further comprising:
    means for selecting the at least one sector to be included in the set of sectors in accordance with a pilot energy of the at least one sector.

13. The access terminal of claim 11, further comprising:
    means for ranking sectors included in a candidate set for the access terminal in accordance with a pilot energy of each sector included in the candidate set; and
    means for selecting the at least one sector to be included in the set of sectors in accordance with the ranking.

14. The access terminal of claim 11, wherein the means for generating the set of sectors comprises:
    means for selecting N strongest sectors in the candidate set in accordance with a pilot energy of each of the sectors in the candidate set; and
    means for adding at least one of the N selected sectors to the set of sectors.

15. The access terminal of claim 11, further comprising:
    means for removing a first sector from the set of sectors, responsive to the first sector being removed from the candidate set.

16. The access terminal of claim 11, further comprising:
    means for ranking a combined set of sectors comprising the sectors in the active set and the candidate set for the access terminal in accordance with a signal-to-interference-and-noise ratio of each of the combined set of sectors; and
    means for re-generating the set of sectors in accordance with the ranking.

17. The access terminal of claim 10, wherein the set of sectors comprises less than all sectors included in the active set for the access terminal.

18. The access terminal of claim 10, further comprising: means for autonomously assigning the at least one finger of the receiver to each sector in the set of sectors without receiving authorization from a network.

19. An access terminal configured for wireless communication, comprising:
a processing circuit;
a memory coupled to the processing circuit; and
a communications interface coupled to the processing circuit, the communications interface comprising an interference cancellation engine,
wherein the processing circuit is configured to:
generate a set of sectors, the set of sectors comprising at least one sector not included in an active set for the access terminal;
assign at least one finger of a receiver of the communications interface to each sector in the set of sectors;
generate an interference estimate corresponding to the set of sectors; and
cancel interference from the set of sectors in accordance with the generated interference estimate.

20. The access terminal of claim 19, wherein the at least one sector not included in the active set comprises a sector included in a candidate set, and wherein the candidate set comprises a set of sectors that are candidates to be added to the active set for the access terminal.

21. The access terminal of claim 20, wherein the processing circuit is further configured to select the at least one sector to be included in the set of sectors in accordance with a pilot energy of the at least one sector.

22. The access terminal of claim 20, wherein the processing circuit is further configured to:
rank sectors included in a candidate set for the access terminal in accordance with a pilot energy of each sector included in the candidate set; and
select the at least one sector to be included in the set of sectors in accordance with the ranking.

23. The access terminal of claim 20, wherein the processing circuit, being configured to generate the set of sectors, is further configured to:
select N strongest sectors in the candidate set in accordance with a pilot energy of each of the sectors in the candidate set; and
add at least one of the N selected sectors to the set of sectors.

24. The access terminal of claim 20, wherein the processing circuit is further configured to: remove a first sector from the set of sectors, responsive to the first sector being removed from the candidate set.

25. The access terminal of claim 20, wherein the processing circuit is further configured to:
rank a combined set of sectors comprising the sectors in the active set and the candidate set for the access terminal in accordance with a signal-to-interference-and-noise ratio of each of the combined set of sectors; and
re-generate the set of sectors in accordance with the ranking.

26. The access terminal of claim 19, wherein the set of sectors comprises less than all sectors included in the active set for the access terminal.

27. The access terminal of claim 19, wherein the processing circuit is further configured to: autonomously assign the at least one finger of the receiver to each sector in the set of sectors without receiving authorization from a network.

28. A computer program product, comprising:
a non-transitory computer-readable storage medium operative at an access terminal configured for wireless communication, comprising instructions for causing a computer to:
generate a set of sectors, the set of sectors comprising at least one sector not included in an active set for the access terminal;
assign at least one finger of a receiver of the communications interface to each sector in the set of sectors;
generate an interference estimate corresponding to the set of sectors; and
cancel interference from the set of sectors in accordance with the generated interference estimate.

29. The computer program product of claim 28, wherein the at least one sector not included in the active set comprises a sector included in a candidate set, and wherein the candidate set comprises a set of sectors that are candidates to be added to the active set for the access terminal.

30. The computer program product of claim 29, wherein the computer-readable storage medium further comprises instructions for causing a computer to select the at least one sector to be included in the set of sectors in accordance with a pilot energy of the at least one sector.

31. The computer program product of claim 29, wherein the computer-readable storage medium further comprises instructions for causing a computer to:
rank sectors included in a candidate set for the access terminal in accordance with a pilot energy of each sector included in the candidate set; and
select the at least one sector to be included in the set of sectors in accordance with the ranking.

32. The computer program product of claim 29, wherein the instructions for causing a computer to generate the set of sectors, are further configured to:
select N strongest sectors in the candidate set in accordance with a pilot energy of each of the sectors in the candidate set; and
add at least one of the N selected sectors to the set of sectors.

33. The computer program product of claim 29, wherein the computer-readable storage medium further comprises instructions for causing a computer to remove a first sector from the set of sectors, responsive to the first sector being removed from the candidate set.

34. The computer program product of claim 29, wherein the computer-readable storage medium further comprises instructions for causing a computer to:
rank a combined set of sectors comprising the sectors in the active set and the candidate set for the access terminal in accordance with a signal-to-interference-and-noise ratio of each of the combined set of sectors; and
re-generate the set of sectors in accordance with the ranking.

35. The computer program product of claim 28, wherein the set of sectors comprises less than all sectors included in the active set for the access terminal.

36. The computer program product of claim 28, further comprising instructions for causing the access terminal to: autonomously assign the at least one finger of the receiver to each sector in the set of sectors without receiving authorization from a network.

* * * * *